United States Patent [19]

Hamrick et al.

[11] 4,174,926
[45] Nov. 20, 1979

[54] WINDMILL PUMP DRIVE SYSTEM

[75] Inventors: Joseph T. Hamrick, Roanoke; Leslie C. Rose, Rocky Mount, both of Va.

[73] Assignee: World Energy Systems, Fort Worth, Tex.

[21] Appl. No.: 839,419

[22] Filed: Oct. 5, 1977

Related U.S. Application Data

[63] Continuation-in-part of Ser. No. 803,525, Jun. 6, 1977.

[51] Int. Cl.² .......................... F04B 17/02; F04B 9/08
[52] U.S. Cl. .................................. 417/334; 417/390; 60/418; 60/398
[58] Field of Search .................. 60/398, 413, 415, 416, 60/418, 404, 459, 325; 417/390, 334, 335, 336; 290/44, 55

[56] References Cited

U.S. PATENT DOCUMENTS

| 196,128 | 10/1877 | Snook | 60/413 |
|---|---|---|---|
| 672,762 | 4/1901 | Graham | 60/413 |
| 1,010,591 | 12/1911 | Clements | 290/55 |
| 1,035,431 | 8/1912 | Ericson | 60/398 X |
| 1,247,520 | 11/1917 | Fessenden | 60/398 X |
| 1,254,737 | 1/1918 | Smithey | 417/336 |
| 2,149,600 | 3/1939 | Guinard | 417/390 |
| 2,710,579 | 6/1955 | Kriegbaum | 417/365 |
| 3,910,728 | 10/1975 | Sloan | 417/390 |

Primary Examiner—William L. Freeh
Assistant Examiner—Leonard E. Smith
Attorney, Agent, or Firm—Wofford, Fails & Zobal

[57] ABSTRACT

A fluid driven power system is located in a borehole for driving a downhole pump for pumping water to the surface. An uphole pump driven by a windmill is provided for pumping fluid from a storage system downhole for operating the fluid driven power system. An energy storage system is provided for operating the downhole fluid driven power system when the wind velocity is low. The energy storage system comprises a fluid accumulator which is pressurized by fluid from the uphole pump during low velocity wind. As the pressure in the accumulator builds up to a certain level, fluid from the accumulator is released to operate the downhole fluid driven power system.

6 Claims, 3 Drawing Figures und 4,174,926

WINDMILL PUMP DRIVE SYSTEM

This application is a continuation-in-part of U.S. patent application Ser. No. 803,525 filed June 6, 1977.

BACKGROUND OF THE INVENTION

Windmills have been used traditionally for pumping water directly from wells to livestock watering troughs or for dewatering low areas to prevent flooding. Their economical use for driving deep well irrigation pumps has not yet been demonstrated. To drive a pump of the size that is normally used for irrigation would require an uneconomically large windmill for wind velocities in 8 to 12 mph range. For example, to lift water 225 feet with an 82% efficient pump and piping system at a rate of 600 gpm would require an input of 41.5 horsepower and a two blade propeller type windmill approximately 126 feet in diameter. A windmill designed for continuous irrigation pump operation in fresh breeze (19-24 mph) or a strong breeze (25-31 mph) would be one fourth as large or approximately 30 feet in diameter. Because of the low horsepower that would be generated by a 30 foot diameter windmill at 10 miles per hour (2.3 hp), some means of energy storage would be required for operating the pump in low velocity wind.

SUMMARY OF THE INVENTION

It is an object of the present invention to provide a unique pump drive system for a water well operated by a windmill. The pump drive system comprises a fluid driven power system located in a borehole for driving a downhole pump for pumping water to the surface. An uphole pump driven by a windmill is provided for pumping fluid from a storage system downhole for operating the fluid driven power system.

It is a further object of the present invention to provide an energy storage system for operating the downhole fluid driven power system when the wind velocity is low. The energy storage system comprises a fluid accumulator which is pressurized by fluid from the uphole pump during low velocity wind. As the pressure in the fluid accumulator builds up to a certain level, fluid from the accumulator is released to operate the downhole fluid driven power system.

DETAILED DESCRIPTION OF THE INVENTION

Figure 1:
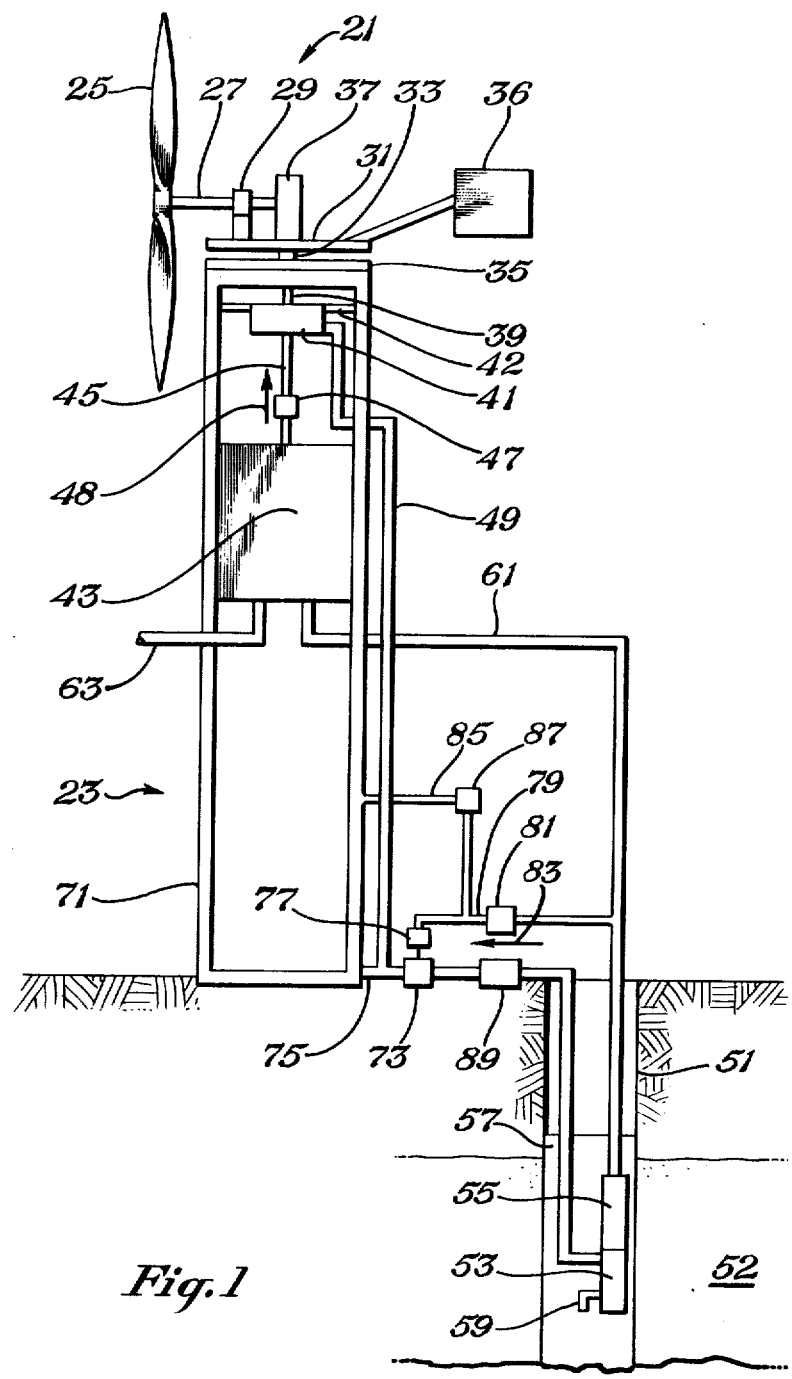
FIG. 1 illustrates one embodiment of the present invention wherein water is used to operate the downhole pump drive.

Referring now to FIG. 1, there is illustrated a windmill 21 supported on a pedestal 23. The windmill 21 comprises a wind driven propeller 25 connected to a shaft 27 which is supported for rotation by bearings 29 mounted on a platform 31. Platform 31 is supported to be turned on a shaft 33 which is connected to a base 35 mounted on the top of pedestal 23. Tail fin 36 is used to counter torque and keep the propeller 25 facing the wind. As the propeller 25 is turned by the wind, the shaft 27 drives a speed increaser and gear system 37.

Power is transmitted from the speed increaser 37 through a shaft 39 to a pump 41 connected to the pedestal 23 by rods 42. Shaft 39 extends through shaft 33. The fluid inlet of the pump 41 is connected to a water reservoir 43 by way of a conduit 45 having check 47. Valve 47 allows flow through conduit 45 only in the direction of the arrow 48. The fluid outlet of the pump 41 is connected to a conduit 49 which extends downward into borehole 51 of a water well and which traverses water bearing sands 52. In the borehole 51 conduit 49 is connected to the fluid inlet of a turbine 53 which is employed to drive a pump 55 for pumping water 57 in the borehole to the surface. The pump 55 is driven by the mechanical output of the turbine 53 (not shown). Water from the turbine 53 is exhausted into the borehole through an exhaust port 59. The fluid outlet of the pump 55 is connected to a conduit 61 which extends upward to the borehole and to the surface where it is connected to the fluid inlet of water reservoir 43. Water is drawn off from the reservoir 43 for use, through conduit 63. Thus as the windmill turns, uphole pump 41 pumps water from the reservoir 43 down through conduit 49 to drive the turbine 53 which in turn operates the pump 55. As pump 55 is operated, it pumps a larger volume of water upward through conduit 61 to the reservoir 43 where it is drawn off for use through conduit 63.

A system also is provided for operating the downhole pump 55 when the power generated by the windmill 25 is not adequate to drive the pump 55 due to low wind velocity. This system comprises a fluid accumulator which is formed by pipes 71 which make up the framework of pedestal 23. A valve 73 is connected in the conduit 49 and a conduit 75 is connected to the accumulator pipe 71 and to the conduit 49 between valve 73 and pump 41. Conduit 75 allows water flow between conduit 49 and the accumulator pipes 71. The accumulator pipes 71 will be provided with an initial air pressure.

The valve 73 is controlled by an operator 77 coupled to conduit 79 which also is coupled to conduit 61. When the pressure in conduit 79 and hence in conduit 61 is low, a spring in operator 77 closes the valve 73. When the pressure in conduit 79 and hence in conduit 61 is high, the fluid pressure overcomes the bias of the operator spring and the operator opens the valve 73. A spring loaded check valve 81 is connected in conduit 79 and allows flow only in the direction of the arrow 83. A conduit 85 having a pressure relief valve 87 connected therein, is connected to the accumulator pipe 71 and to the conduit 79. Reference numeral 89 identifies a pressure regulator.

In operation, when the wind velocity is sufficiently high, the power generated by the turbine 53 is adequate to drive the pump 55 to pump water upward through conduit 61 at a satisfactory pressure. During this time, the check valve 81 admits flow freely to the operator 77 to maintain the valve 73 open. When the wind velocity is low, the output of the downhole pump 55 decreases and the pressure in conduit 61 drops. At a certain low pressure level, the spring in the check valve 81 closes valve 81. The resulting drop in pressure to the operator 77 allows its spring to close valve 73. As the windmill continues to turn in the low velocity wind, uphole pump 41 continues to operate and pressure in the accumulator pipes 71 builds up. When the pressure in the accumulator pipes 71 builds up to a certain high level, the pressure relief valve 87 opens and admits pressure to the operator 77 to open the valve 73. Thus turbine 53 begins to operate again to operate the pump 55 until the pressure in accumulator pipes 71 drops to a certain level whereby the turbine 53 and pump 55 stop operating again. When this occurs and the pressure decays in the water delivery conduit 61, a small orifice in check valve 81 allows bleed off of pressure into conduit 79 from left to right as seen in FIG. 1. The spring in operator 77 then closes the valve 73 and the cycle repeated until the wind velocity increases to a value sufficient to operate the downhole turbine 53.

As an example, four, twelve inch diameter support pipes 71, 60 feet high, provide a 188 cubic foot storage volume. With an initial air pressure of 500 lbs. per square inch in the pipes, a build up to a 1,000 lbs. per square inch air-over-water accumulator pressure would allow irrigation pump operation for approximately 5 minutes. In this example, the pressure relief valve 87 may be set to open at 1,000 lbs. per square inch. The time required for build-up to 1,000 lbs. per square inch will vary from 60 to 80 minutes in a wind velocity of 10 miles per hour.

In one embodiment, pumps 41 and 55 may be centrifugal type pumps. In another embodiment, the speed increaser 37 and the pump 41 may be a constant ratio speed increaser driving a piston type pump of the type built by Wanner Engineering, Inc. of 6600 South County Rd. 18, Hopkins, Minn. For that pump, the action of oil from pistons is transferred through membranes to the fluid being pumped. The pump is satisfactory for use with water, pumping against a pressure of 1,000 lbs. per square inch at any speed. As the available horse-power input increases, the speed and flow rate increase. At the 60 foot height, the wind velocity is not greatly affected by ground friction.

The turbine 53 for driving the downhole pump 55 is limited in diameter because of the restriction of the well casing and requires multiple staging of radial in-flow impellers similar to those used in the irrigation pump 55. Turbines are generally more efficient than pumps because the flow accelerates on the vane surfaces rather than decelerating as occurs with pump vanes. With accelerating flow on a surface, the fluid adjacent to the surface does not have a tendency to build a thick boundary layer and separate. Alternatively, a positive displacement hydraulic motor of the piston type similar to the Wanner Engineering pump may be used instead of the turbine 53.

For the foregoing example, the amount of water required to operate the downhole turbine comprises approximately 20% of the water pumped.

Figure 2:
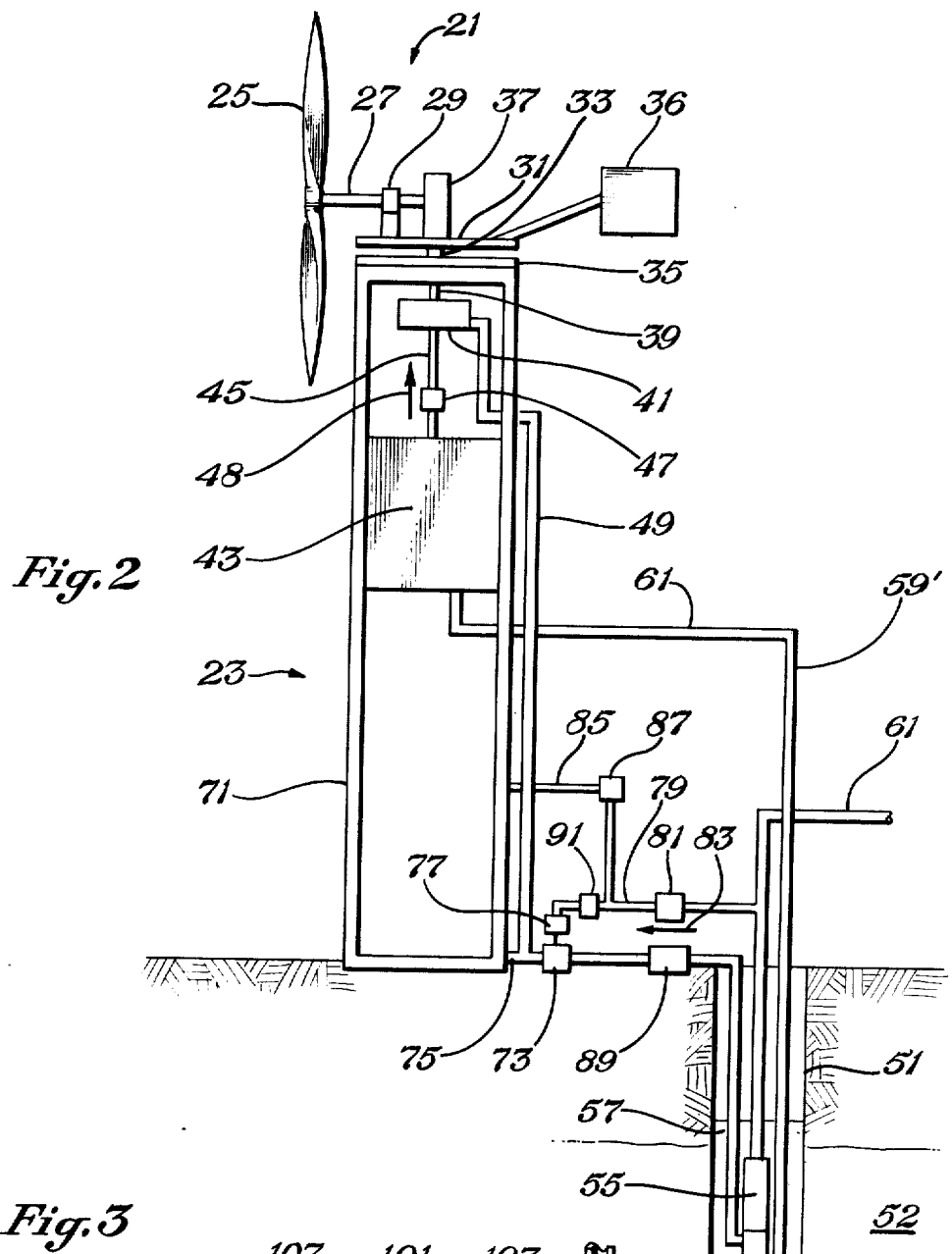
FIG. 2 illustrates another embodiment of the present invention wherein hydraulic fluid is used to operate the downhole pump drive.

A system in which a petroleum based hydraulic fluid with pump and motor of piston, gear, or vane type may be used in the system of the invention. In this case, conduits are required for both delivery of oil to the hydraulic motor and return of oil to a surface reservoir for reuse in the hydraulic pump. With the use of hydraulic oil, the accumulator would require charging with nitrogen instead of air because of the possibility of reaction of the hydraulic oil with air. Such a system is illustrated in FIG. 2. In this Figure, like reference numerals identify the same components as shown in FIG. 1 except for the following. In the system of FIG. 2, pump 41 is a hydraulic motor and downhole power means 53 is a hydraulic motor for operating the pump 55. Reservoir 43 is used to store the hydraulic fluid and water conduit 61 is connected to a water reservoir (not shown). The exhaust 59' from hydraulic motor 53 extends to the surface where it is connected to the inlet of the hydraulic fluid reservoir 43. The output 63 of the system of FIG. 1 is not employed in the system of FIG. 2. In addition, a separator 91 is connected in the conduit 79 between the check valve 81 and the operator 77. The separator may be a piston which floats in a cylinder for maintaining a separation between the water and the hydraulic fluid in the conduit 79. Thus the system of FIG. 2 would operate the same as the system of FIG. 1 except that it employs hydraulic fluid to drive downhole hydraulic motor 53 for operating the pump 55. In addition hydraulic fluid is employed in the accumulator pipes 71 instead of water.

Although not shown, a conventional water reservoir may be needed to store water during gale or near gale periods or when use of the water such as for irrigation purposes is not needed.

Figure 3:
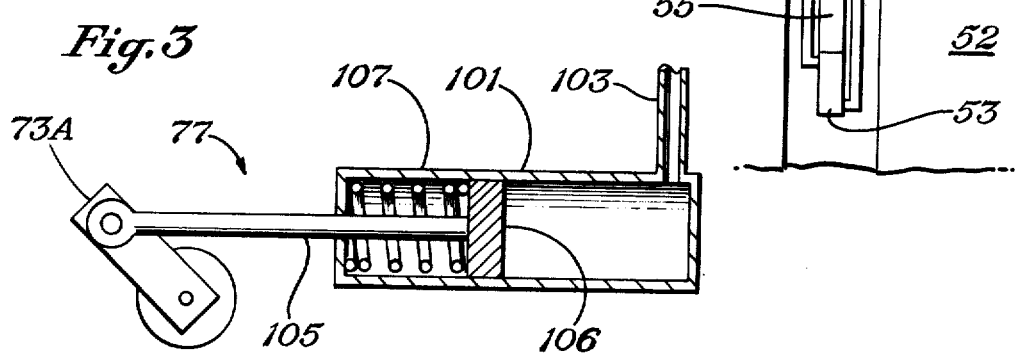
FIG. 3 illustrates a component of the systems of FIGS. 1 and 2.

Referring to FIG. 3 there is illustrated one type of operator 77 for use in the systems of FIGS. 1 and 2. The operator 77 comprises a cylinder 101 having a port 103 connected to conduit 79. A piston rod 105 has one end connected to a piston 106 which is located in the cylinder 101 and an opposite end connected to a crank 73A of the valve 73 for opening and closing the valve 73. A spring 107 is located in the cylinder and biases the piston 106 toward the right as seen in FIG. 3 to close the valve 73 when the fluid pressure in conduit 79 is low. When the fluid pressure in conduit 79 is high, it acts on piston 106 and overcomes the bias of the spring 107 to move the piston rod 105 toward the left, as seen in FIG. 3, to open the valve 73.

We claim:

1. A system for pumping water from subsurface formations to the surface through a borehole, comprising:
   pump means located in the borehole for pumping water in the borehole to the surface,
   fluid driven power means located in the borehole for driving said pump means,
   fluid storage means located at the surface,
   second pump means located at the surface and coupled to said fluid storage means,
   fluid accumulator means,
   conduit means coupled from the outlet of said second pump means to said fluid accumulator means and to said fluid driven power means located in the borehole,
   wind operated means located at the surface for operating said second pump means for pumping fluid from said fluid storage means through said conduit means to said fluid driven power means for operation thereof,
   valve means coupled to said conduit means and adapted to be opened and closed for allowing fluid to flow through said conduit means to said fluid driven power means and for stopping the flow of fluid through said conduit means to said fluid driven power means respectively, and
   control means responsive to the pressure of the water pumped by said pump means located in the borehole for closing said valve means when said pressure is below a certain level and for opening said valve means when said pressure is above said certain level,
   said control means being responsive to the pressure in said fluid accumulator means for opening said valve means when the pressure in said fluid accumulator means rises above a predetermined level.

2. A system for pumping water from subsurface formations to the surface through a borehole, comprising:

borehole pump means located in the borehole for pumping water in the borehole to the surface, fluid driven power means located in the borehole for driving said pump means, fluid storage means located at the surface, second pump means located at the surface and coupled to said fluid storage means, conduit means coupled from the outlet of said second pump means to said fluid driven power means located in the borehole, accumulator means coupled to said conduit means, wind operated means located at the surface for operating said second pump means for pumping fluid from said fluid storage means through said conduit means to said fluid driven power means for operation thereof, and means including control means responsive to the pressure of the water pumped by said borehole pump means for blocking the flow of fluid through said conduit means to said fluid driven power means when said pressure is below a certain level and for allowing all of the fluid from said outlet of said second pump means to flow into said accumulator means by way of said conduit means, said control means being responsive to the pressure in said accumulator means for allowing the fluid in said accumulator means to flow through said conduit means to said fluid driven power means when the pressure in said accumulator means rises above a predetermined level for operating said fluid driven power means.

3. A system for pumping water from subsurface formations to the surface through a borehole, comprising:

pump means located in the borehole for pumping water in the borehole to the surface, fluid driven power means located in the borehole for driving said pump means, fluid storage means located at the surface, second pump means located at the surface and coupled to said fluid storage means, conduit means coupled from the outlet of said second pump means to said fluid driven power means located in the borehole, wind operated means located at the surface for operating said second pump means for pumping fluid from said fluid storage means through said conduit means to said fluid driven power means for operation thereof, fluid accumulator means, valve means coupled to said conduit means and adapted to be opened and closed for allowing fluid to flow through said conduit means and for stopping the flow of fluid through said conduit means respectively, fluid passage means coupled to said fluid accumulator means and to said conduit means between said second pump means and said valve means, and control means responsive to the pressure of the water pumped by said pump means located in the borehole for closing said valve means when said pressure is below a certain level and for opening said valve means when said pressure is above said certain level, said control means being responsive to the pressure in said fluid accumulator for opening said valve means when the pressure in said fluid accumulator rises above a predetermined level.

4. The system of claim 3 wherein;

said fluid accumulator comprises conduit means forming the support of said windmill.

5. A system for pumping water from subsurface formations to the surface through a borehole, comprising:

pump means located in the borehole for pumping water in the borehole to the surface, fluid driven power means located in the borehole for driving said pump means, water storage means located at the surface, first conduit means for flowing water from said pump means to said water storage means, second pump means located at the surface and coupled to said water storage means, second conduit means coupled from the outlet of said second pump means to said fluid driven power means, wind operated means located at the surface for operating said second pump means for pumping water from said water storage means through said second conduit means to said fluid driven power means for operation thereof, fluid accumulator means, valve means coupled to said second conduit means and adapted to be opened and closed for allowing water to flow through said second conduit means and for stopping the flow of water through said second conduit means respectively, fluid passage means coupled to said fluid accumulator means and to said second conduit means between said second pump means and said valve means and, control means responsive to the pressure of the water pumped by said pump means located in the borehole for closing said valve means when said pressure is below a certain level and for opening said valve means when said pressure is above said certain level, said control means being responsive to the pressure in said fluid accumulator means for opening said valve means when the pressure in said fluid accumulator means rises above a predetermined level.

6. A system for pumping water from subsurface formations to the surface through a borehole, comprising:

pump means located in the borehole for pumping water in the borehole to the surface, hydraulic fluid driven power means located in the borehole for driving said pump means, hydraulic fluid storage means located at the surface, second pump means located at the surface and coupled to said hydraulic fluid storage means, supply conduit means coupled from the outlet of said second pump means to said hydraulic driven power means, return conduit means coupled from the outlet of said hydraulic fluid driven power means to said hydraulic fluid storage means, wind operated means located at the surface for operating said second pump means for pumping hydraulic fluid from said hydraulic fluid storage means through said supply conduit means to said hydraulic fluid driven power means for operation thereof, fluid accumulator means, valve means coupled to said supply conduit means adapted to be opened and closed for allowing hydraulic fluid to flow through said supply conduit means and for stopping the flow of hydraulic fluid through said supply conduit means respectively, fluid passage means coupled to said fluid accumulator means and to said supply conduit means between said second pump means and said valve means, and control means responsive to the pressure of the water pumped by said pump means located in the borehole for closing said valve means when said pressure is below a certain level and for opening said valve means when said pressure is above said certain level, said control means being responsive to the pressure in said fluid accumulator means for opening said valve means when the pressure in said fluid accumulator means rises above a predetermined level.

* * * * *